US012695542B2

(12) United States Patent
Kakizaki et al.

(10) Patent No.: US 12,695,542 B2
(45) Date of Patent: Jul. 28, 2026

(54) DECODING CIRCUIT, DECODING METHOD AND COMPUTER PROGRAM

(71) Applicant: NTT, Inc., Tokyo (JP)

(72) Inventors: Takeshi Kakizaki, Musashino (JP); Masanori Nakamura, Musashino (JP); Fukutaro Hamaoka, Musashino (JP)

(73) Assignee: NTT, Inc., Tokyo (JP)

( * ) Notice: Subject to any disclaimer, the term of this patent is extended or adjusted under 35 U.S.C. 154(b) by 82 days.

(21) Appl. No.: 18/860,571

(22) PCT Filed: May 17, 2022

(86) PCT No.: PCT/JP2022/020454
§ 371 (c)(1),
(2) Date: Oct. 25, 2024

(87) PCT Pub. No.: WO2023/223402
PCT Pub. Date: Nov. 23, 2023

(65) Prior Publication Data
US 2025/0293802 A1 Sep. 18, 2025

(51) Int. Cl.
*H04L 27/06* (2006.01)
*H04L 1/00* (2006.01)
(52) U.S. Cl.
CPC .................................. *H04L 1/0054* (2013.01)
(58) Field of Classification Search
CPC .... H04L 1/0054; H04L 1/0045; H03M 13/41; H03M 13/4107; H03M 13/1174
(Continued)

(56) References Cited

U.S. PATENT DOCUMENTS 7,010,738 B2 3/2006 Morioka et al.
9,166,739 B2 10/2015 Sakai et al.
(Continued)

FOREIGN PATENT DOCUMENTS

CN 108270515 A 7/2018
CN 111200441 A 5/2020
(Continued)

OTHER PUBLICATIONS

Giuseppe Caire et al., Bit-Interleaved Coded Modulation, IEEE Transactions on Information Theory, vol. 44, No. 3, May 1998, pp. 927-946.
(Continued)

*Primary Examiner* — Khai Tran
(74) *Attorney, Agent, or Firm* — Harness, Dickey & Pierce, PLC

(57) ABSTRACT

Provided is a decoding circuit used for coherent digital signal processing, including: a distributor that distributes a decoding metric obtained by demodulating transmission data transmitted from a transmission device to each of a plurality of lanes on the basis of information on noise generated in a communication channel and a received signal; a first likelihood calculation circuit that is provided in one of the plurality of lanes and calculates a first logarithmic likelihood ratio using the decoding metric distributed by the distributor; a decoding unit that performs error correction decoding using the first logarithmic likelihood ratio and acquires an error-corrected code word; one or more second likelihood calculation circuits that are provided in a lane different from the lane in which the first likelihood calculation circuit is provided among the plurality of lanes, calculate a second logarithmic likelihood ratio on the basis of the decoding metric distributed by the distributor and the acquired code word, and perform hard decision; a combin- (Continued)

ing unit that combines an output of the decoding unit and an output of the one or more second likelihood calculation circuits; and an outer code decoding unit that decodes an outer code.

5 Claims, 3 Drawing Sheets

(58) Field of Classification Search
USPC .......................................... 375/341; 714/773
See application file for complete search history.

(56) References Cited

U.S. PATENT DOCUMENTS

| | | |
|---|---|---|
| 2011/0206158 A1 | 8/2011 | Kim et al. |
| 2012/0297273 A1* | 11/2012 | Sakaue .............. H03M 13/1177 |
| | | 714/E11.035 |
| 2014/0250325 A1* | 9/2014 | Mege .................... H04L 1/1845 |
| | | 714/18 |
| 2017/0099173 A1 | 4/2017 | Yun et al. |
| 2020/0127680 A1 | 4/2020 | Kim |
| 2021/0218496 A1 | 7/2021 | Koganei et al. |

FOREIGN PATENT DOCUMENTS

| | | |
|---|---|---|
| CN | 111200481 A | 5/2020 |
| EP | 2843662 A1 | 3/2015 |
| JP | 2018520617 A | 7/2018 |
| JP | 2021111864 A | 8/2021 |
| KR | 0133508 B1 | 4/1998 |
| WO | WO-2008087598 A2 | 7/2008 |
| WO | WO-2017057206 A1 | 4/2017 |

OTHER PUBLICATIONS

Hideki Imai et al., A New Multilevel Coding Method Using Error-Correcting Codes, IEEE Transactions on Information Theory, vol. IT-23, No. 3, 1977, pp. 371-377.
Takeshi Kakizaki et al., Low-complexity Channel Polarized Multilevel Coding for Modulation-format-independent Forward Error Correction, ECOC2021, (2021).

Takeshi Kakizaki et al., Low-complexity Channel-polarized Multilevel Coding for Probabilistic Amplitude Shaping, OFC2022, (2022).
Akira Yamada et al., A Study on Quantization for BP Decoding of Polar Codes, IEICE Technical Report, Mar. 2020, vol. 119, No. 448, pp. 263-268.
Georg Bocherer et al., Bandwidth Efficient and Rate-Matched Low-Density Parity-Check Coded Modulation, IEEE Transactions on Communications, vol. 63, No. 12, Dec. 2015, pp. 4651-4665.
Tsuyoshi Yoshida et al., Multilevel Coding with Flexible Probabilistic Shaping for Rate-Adaptive and Low-Power Optical Communications, OFC 2020, 2020, pp. 1-3.
Kiichi Sugitani et al., Performance Evaluation of WDM Channel Transmission for Probabilistic Shaping With Partial Multilevel Coding, Journal of Lightwave Technology, vol. 39, No. 9, May 1, 2021, pp. 2873-2879.
Bipin Sankar Gopalakrishna Pillai et al., End-to-End Energy Modeling and Analysis of Long-Haul Coherent Transmission Systems, Journal of Lightwave Technology, vol. 32, No. 18, Sep. 15, 2014.
OIF-FEC-100G-01.0, 100G Forward Error Correction White Paper (May 2010), Optical Internetworking Forum.
F. Gabry et al., Multi-Kernel Construction of Polar Codes, 2017 IEEE International Conference on Communications Workshops (ICC Workshops), pp. 761-765 (2017).
H. Lin et al., Linear and Nonlinear Binary Kernels of Polar Codes of Small Dimensions With Maximum Exponents, IEEE Transactions on Information Theory, 61(10), 5253, (2015).
I. Tal et al., List Decoding of Polar Codes, IEEE Transactions on Information Theory, 61(5) 2213, (2015).
Andreas Bisplinghoff et al., Low-Power, Phase-Slip Tolerant, Multilevel Coding for M-QAM, Journal of Lightwave Technology, vol. 35, No. 4, Feb. 15, 2017, pp. 1006-1014.
Masoud Barakatain et al., Performance-Complexity Tradeoffs of Concatenated FEC for Higher-Order Modulation, Journal of Lightwave Technology, vol. 38, No. 11, Jun. 1, 2020, pp. 2944-2953.
Yohei Koganei et al., Multilevel Coding With Spatially Coupled Repeat-Accumulate Codes for High-Order QAM Optical Transmission, Journal of Lightwave Technology, vol. 37, No. 2, Jan. 15, 2019, pp. 486-492.
International Search Report of the ISA issued in PCT/JP2022/020454, mailed on Aug. 23, 2022. ISA/JP.

* cited by examiner

DECODING CIRCUIT, DECODING METHOD AND COMPUTER PROGRAM

CROSS-REFERENCE TO RELATED APPLICATIONS

This application is a 371 U.S. National Phase of International Application No. PCT/JP2022/020454, filed on May 17, 2022. The entire disclosure of the above application is incorporated herein by reference.

TECHNICAL FIELD

The present invention relates to a decoding circuit, a decoding method, and a computer program.

BACKGROUND ART

With increases in Internet traffic, optical transmission systems are required to have a larger capacity. Therefore, in forward error correction (FEC) in a coherent digital signal processor (DSP) used in an optical transmission network, a technique for improving frequency utilization efficiency and reducing power consumption of a device has been studied. Conventionally, bit-interleaved coded modulation (BICM) capable of reducing dependence on the modulation multilevel degree during code application (see, for example, Non Patent Literature 1), and multilevel coding (MLC) that efficiently reduces soft-decision FEC (SD-FEC) having high performance but a large calculation amount in order to achieve a low calculation amount have been proposed (see, for example, Non Patent Literature 2).

As a technique similar to the MLC, channel-polarized multilevel coding (CP-MLC) has been proposed (see, for example, Non Patent Literatures 3 and 4). In the CP-MLC, due to a phenomenon called communication channel polarization, the communication channel is divided into a subchannel with high reliability (a subchannel with a large communication channel capacity) and a subchannel with low reliability (a subchannel with a small communication channel capacity) and is made non-uniform, and the SD-FEC is applied only to the subchannel with a small communication channel capacity, so that the FEC calculation amount can be reduced without depending on the modulation method in a binary code framework.

CITATION LIST

Non Patent Literature

Non Patent Literature 1: G. Caire et al., "Bit-Interleaved Coded Modulation", IEEE Transactions on Information Theory, Vol. 44, No 3, 927-946(1998)

Non Patent Literature 2: H. Imai and et al., "A New Multilevel Coding Method Using Error-Correcting Codes", IEEE Transactions on Information Theory, vol IT-23, No. 3, 371-377(1977)

Non Patent Literature 3: T. Kakizaki et al., "Low-complexity Channel Polarized Multilevel Coding for Modulation-format-independent Forward Error Correction", ECOC2021, Th1G.3, (2021).

Non Patent Literature 4: T. Kakizaki et al., "Low-complexity Channel Polarized Multilevel Coding for Probabilistic Amplitude Shaping", OFC2022, W3H.4, (2022)

SUMMARY OF INVENTION

Technical Problem

In a decoding calculation circuit of the CP-MLC, there is a problem that the operation amount of the likelihood calculation of an SD calculation circuit and an HD calculation circuit of a likelihood calculation circuit exponentially increases with respect to a division number d of the subchannel.

In view of the above circumstances, an object of the present invention is to provide a technique capable of high frequency utilization efficiency and reducing the FEC calculation amount regardless of the modulation multilevel degree.

Solution to Problem

An aspect of the present invention provides a decoding circuit used for coherent digital signal processing, including: a distributor that distributes a decoding metric obtained by demodulating transmission data transmitted from a transmission device to each of a plurality of lanes on the basis of information on noise generated in a communication channel and a received signal; a first likelihood calculation circuit that is provided in one of the plurality of lanes and calculates a first logarithmic likelihood ratio using the decoding metric distributed by the distributor; a decoding unit that performs error correction decoding using the first logarithmic likelihood ratio and acquires an error-corrected code word; one or more second likelihood calculation circuits that are provided in a lane different from the lane in which the first likelihood calculation circuit is provided among the plurality of lanes, calculate a second logarithmic likelihood ratio on the basis of the decoding metric distributed by the distributor and the code word acquired by the decoding unit, and perform hard decision; a combining unit that combines an output of the decoding unit and an output of the one or more second likelihood calculation circuits; and an outer code decoding unit that decodes an outer code.

An aspect of the present invention provides a decoding method used for coherent digital signal processing, including: distributing, by a distributor, a decoding metric obtained by demodulating transmission data transmitted from a transmission device to each of a plurality of lanes on the basis of information on noise generated in a communication channel and a received signal; calculating, by a first likelihood calculation circuit that is provided in one of the plurality of lanes, a first logarithmic likelihood ratio using the distributed decoding metric; performing, by a decoding unit, error correction decoding using the first logarithmic likelihood ratio and acquiring an error-corrected code word; calculating, by one or more second likelihood calculation circuits that are provided in a lane different from the lane in which the first likelihood calculation circuit is provided among the plurality of lanes, one or more second logarithmic likelihood ratios on the basis of the decoding metric distributed by the distributor and the acquired code word, and performing hard decision; combining, by a combining unit, an output of the decoding unit and an output of the one or more second likelihood calculation circuits; and decoding, by an outer code decoding unit, an outer code.

An aspect of the present invention provides a computer program for causing a computer to execute processing including: distributing a decoding metric obtained by demodulating transmission data transmitted from a transmission device to each of a plurality of lanes on the basis of information on noise generated in a communication channel and a received signal; calculating a first logarithmic likelihood ratio using the distributed decoding metric; performing error correction decoding using the first logarithmic likelihood ratio and acquiring an error-corrected code word; calculating one or more second logarithmic likelihood ratios on the basis of the distributed decoding metric and the acquired code word, and performing hard decision; combining the obtained results; and decoding an outer code.

Advantageous Effects of Invention

According to the present invention, it is possible to achieve high frequency utilization efficiency and reduce the FEC calculation amount regardless of the modulation multilevel degree.

DESCRIPTION OF EMBODIMENTS

Hereinafter, an embodiment of the present invention will be described with reference to the drawings.

Figure 1:
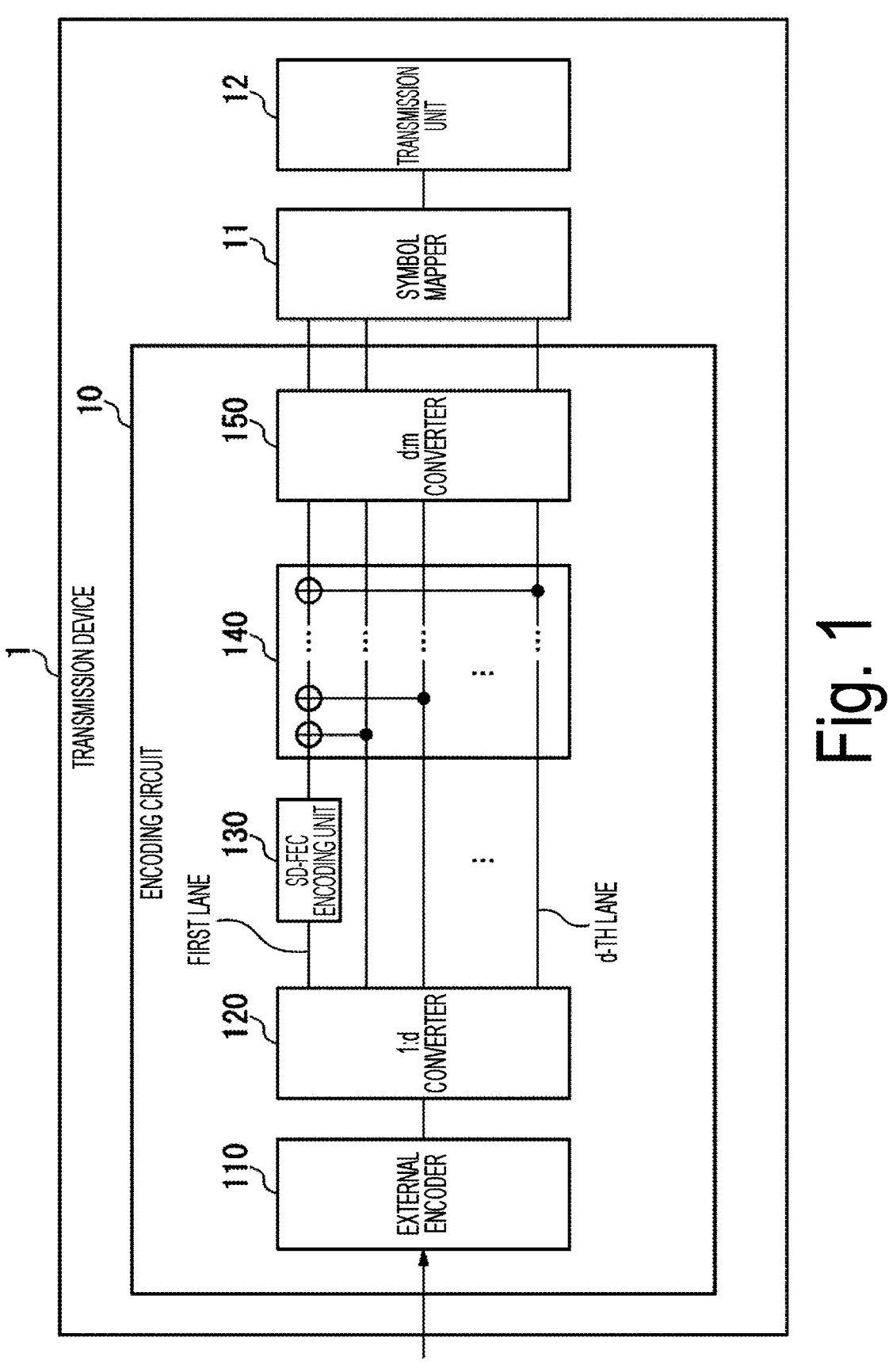
FIG. 1 A block diagram illustrating a configuration example of a transmission device of an embodiment.

FIG. 1 is a block diagram illustrating a configuration example of a transmission device 1 of the embodiment. The transmission device 1 is a part of a digital coherent communication system, and is a transmission device used for transmission of data to be transmitted (hereinafter referred to as "transmission data"). The transmission device 1 transmits the transmission data to a reception device connected via a communication channel. For example, the communication channel is assumed to be an additive white Gaussian noise (AWGN) communication channel.

The transmission device 1 includes an encoding circuit 10, a symbol mapper 11, and a transmission unit 12. The encoding circuit 10 includes an external encoder 110, a 1:d converter 120, an SD-FEC encoding unit 130, a bit conversion circuit 140, and a d:m converter 150.

Transmission target data is input to the external encoder 110. The external encoder 110 simultaneously corrects an error that cannot be corrected in the SD-FEC and all the remaining errors in the input transmission target data. The external encoder 110 is an aspect of an external encoding unit.

The 1:d converter 120 divides the corrected transmission target data output from the external encoder 110 by a predetermined division number d (d is an integer of 2 or more). The 1:d converter 120 allocates a part of the corrected transmission target data (for example, data of d−1) to a first lane and allocates the remaining corrected transmission target data to second to d-th lanes. The 1:d converter 120 may perform interleaving to prevent burst errors caused by inner codes as necessary.

The SD-FEC encoding unit 130 is provided in the first lane and encodes the corrected transmission target data allocated to the first lane using an error correction code.

The bit conversion circuit 140 is a conversion circuit that converts a bit sequence into another bit sequence using exclusive OR. For example, in the first lane, the bit conversion circuit 140 performs exclusive OR on the data of the second to d-th lanes for each bit. The bit conversion circuit 140 outputs the input data as it is in the second to d-th lanes. By combining with a receiver, errors are concentrated in the bits of the first lane, and errors of the bits of the second to d-th lanes are virtually reduced.

The d:m converter 150 converts data of sequences transmitted in the first to d-th lanes into data of sequences of m lanes. m is a bit length per symbol (bit/symbol).

The symbol mapper 11 generates transmission data by allocating data of sequences of in lanes by Gray labeling.

The transmission unit 12 transmits the transmission data generated by the symbol mapper 11.

Figure 2:
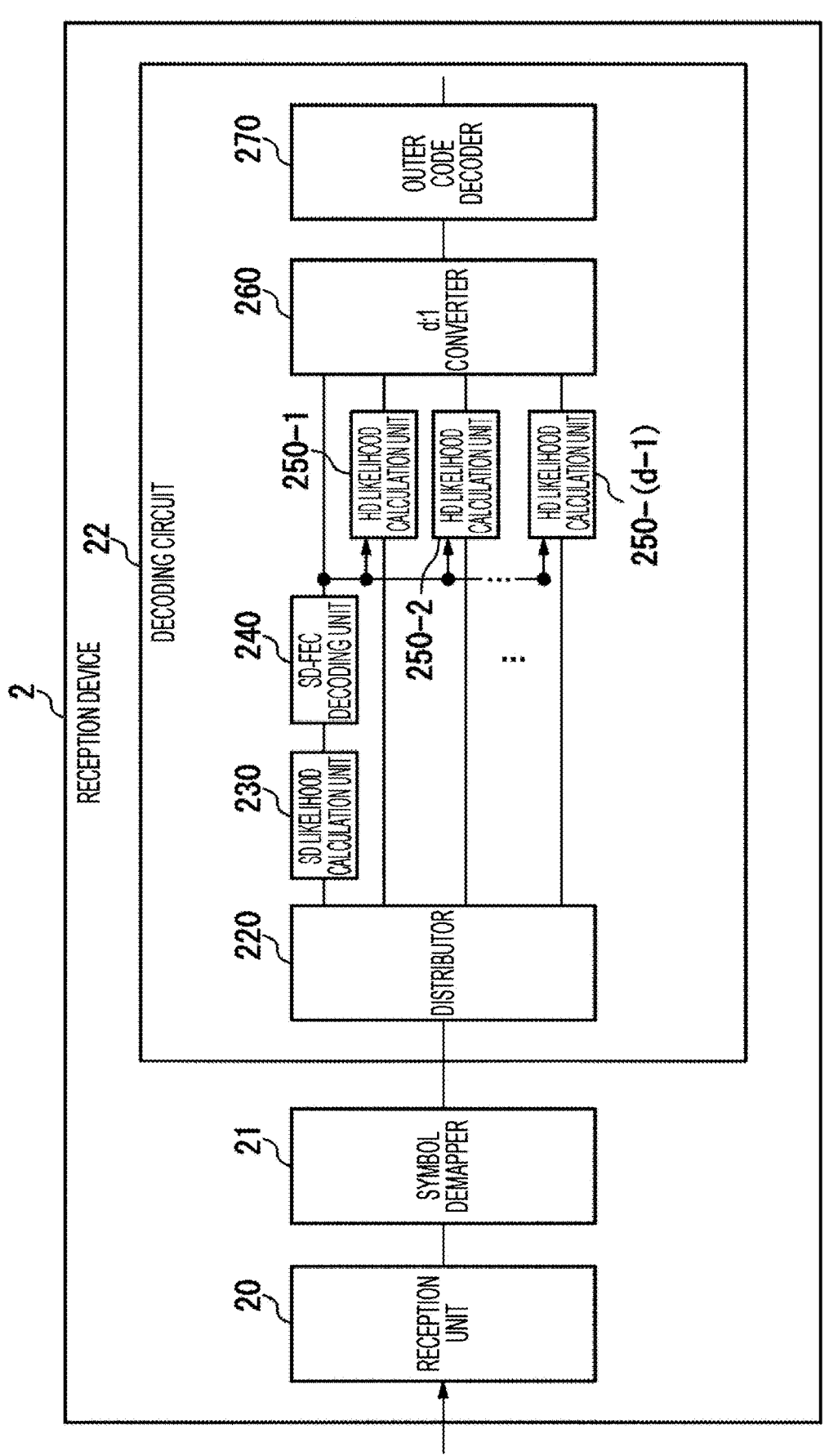
FIG. 2 A block diagram illustrating a configuration example of a reception device of the embodiment.

FIG. 2 is a block diagram illustrating a configuration example of a reception device 2 of the embodiment. The reception device 2 is a reception device used in a digital coherent communication system. The reception device 2 receives the transmission data transmitted from the transmission device 1 connected via the communication channel.

The reception device 2 includes a reception unit 20, a symbol demapper 21, and a decoding circuit 22.

The reception unit 20 receives the transmission data transmitted from the transmission device 1 via the communication channel.

The symbol demapper 21 demodulates the transmission data received by the reception unit 20 by a demodulation method corresponding to a modulation method on the basis of communication channel information and a received signal, and obtains a decoding metric. The decoding metric is, for example, a log-likelihood ratio (LLR). The communication channel information indicates a distribution of noise in the communication channel. The communication channel information can be measured by a spectrum analyzer or the like. The communication channel information is assumed to be measured in advance and stored in an SD likelihood calculation unit 230 to be described later.

The decoding circuit 22 includes a distributor 220, an SD likelihood calculation unit 230, an SD-FEC decoding unit (decoder) 240, a plurality of HD likelihood calculation units 250-1 to 250-($d$-1), a d:1 converter (combiner) 260, and an outer code decoder 270.

The distributor 220 distributes the value (decoding metric) demapped by the symbol demapper 21 from all of the first to d-th lanes.

The SD likelihood calculation unit 230 is provided in the first lane and calculates the likelihood on the basis of the value distributed by the distributor 220.

The processing of the SI) likelihood calculation unit 230 in the present invention will be described more specifically. The SD likelihood calculation unit 230 calculates a logarithmic likelihood ratio LLR$\lambda_1$ on the basis of the value demapped based on a received signal y and communication channel information P(y|x). Specifically, the SD likelihood calculation unit 230 calculates a logarithmic likelihood ratio LLR$\lambda_1$ on the basis of Expression 1. By calculating the logarithmic likelihood ratio LLR$\lambda_1$ by Expression (1), the operation is completed d times.

[Math. 1]

$$\lambda_j^{(1)} = l_j^{(1)} \odot l_j^{(2)} \odot \ldots \odot l_j^{(d)} \tag{1}$$

The right side of Expression (1) is calculated according to Expression (2) on the basis of the communication channel information P(y|x) and the received signal y assumed to be already known.

[Math. 2]

$$l_j^{(i)} := \log \frac{P_{Y|X_j^{(i)}}(y|0)}{P_{Y|X_j^{(i)}}(y|1)} + \log \frac{P_{X_j^{(i)}}(0)}{P_{X_j^{(i)}}(1)} \quad (2)$$

The operator O· (· is located at the center of O) in Expression (1) is defined as Expression (3). The operator O· represents an operator of a function that outputs one real number from two real numbers.

[Math. 3]

(Approximate expression)

$$a \odot b := 2 \tanh^{-1}\left(\tanh\frac{a}{2}\tanh\frac{b}{2}\right) \simeq \text{sgn}(a)\text{sgn}(b)\min(|a|, |b|) \quad (3)$$

Expression (3) is a function that returns +1 in case of sgn(a):=a>0, and returns −1 in case of a≤0.

The SD-FEC decoding unit 240 performs error correction decoding using the logarithmic likelihood ratio LLRλ₁ calculated by the SD likelihood calculation unit 230, and acquires an error-corrected code word $z^{(1)}$.

The plurality of HD likelihood calculation units 250-1 to 250-(d-1) directly calculate a logarithmic likelihood ratio $\lambda_j^{(i)}$ according to following Expression (4) on the basis of $\lambda_j^{(1)}$, $\lambda_j^{(2)}$, . . . , $1_j^{(d)}$. More specifically, the HD likelihood calculation units 250-1 to 250-(d-1) calculate a logarithmic likelihood ratio $\lambda_j^{(i)}$ for each j-th bit on the basis of Expression (4). Here, $z_j^{(1)}$ represents the j-th bit of the bit string of the first lane corrected by the SD-FEC decoding unit 240.

[Math. 4]

$$\lambda_j^{(i)} = l_j^{(i)} + (-1)^{z_j^{(1)}}\left(l_j^{(1)} \odot l_j^{(2)} \odot \ldots \odot l_j^{(i-1)} \odot l_j^{(i+1)} \odot \ldots \odot l_j^{(d)}\right) \quad (4)$$

Thereafter, the HD likelihood calculation units 250-1 to 250-(d-1) perform hard decision on the basis of following Expression (5).

[Math. 5]

$$z_j^{(i)} = \begin{cases} 0 & (\lambda_j^{(i)} \geq 0) \\ 1 & (\lambda_j^{(i)} < 0) \end{cases} \quad (5)$$

The d:1 converter 260 combines an information bit sequence corresponding to the code word $z^{(1)}$ transmitted in one lane and information bit sequences corresponding to the respective code words $z^{(1)}$ output from the HD likelihood calculation units 250-1 to 250-(d-1) into one.

The outer code decoder 270 converts the bit sequence and then decodes the outer code.

According to the reception device 2 configured as described above, by performing likelihood calculation in the logarithmic likelihood region in the likelihood operation circuit of the decoding circuit, it is possible to suppress an increase in the operation amount with respect to the division number of the operation circuit in the CP-MLC.

Figure 3:
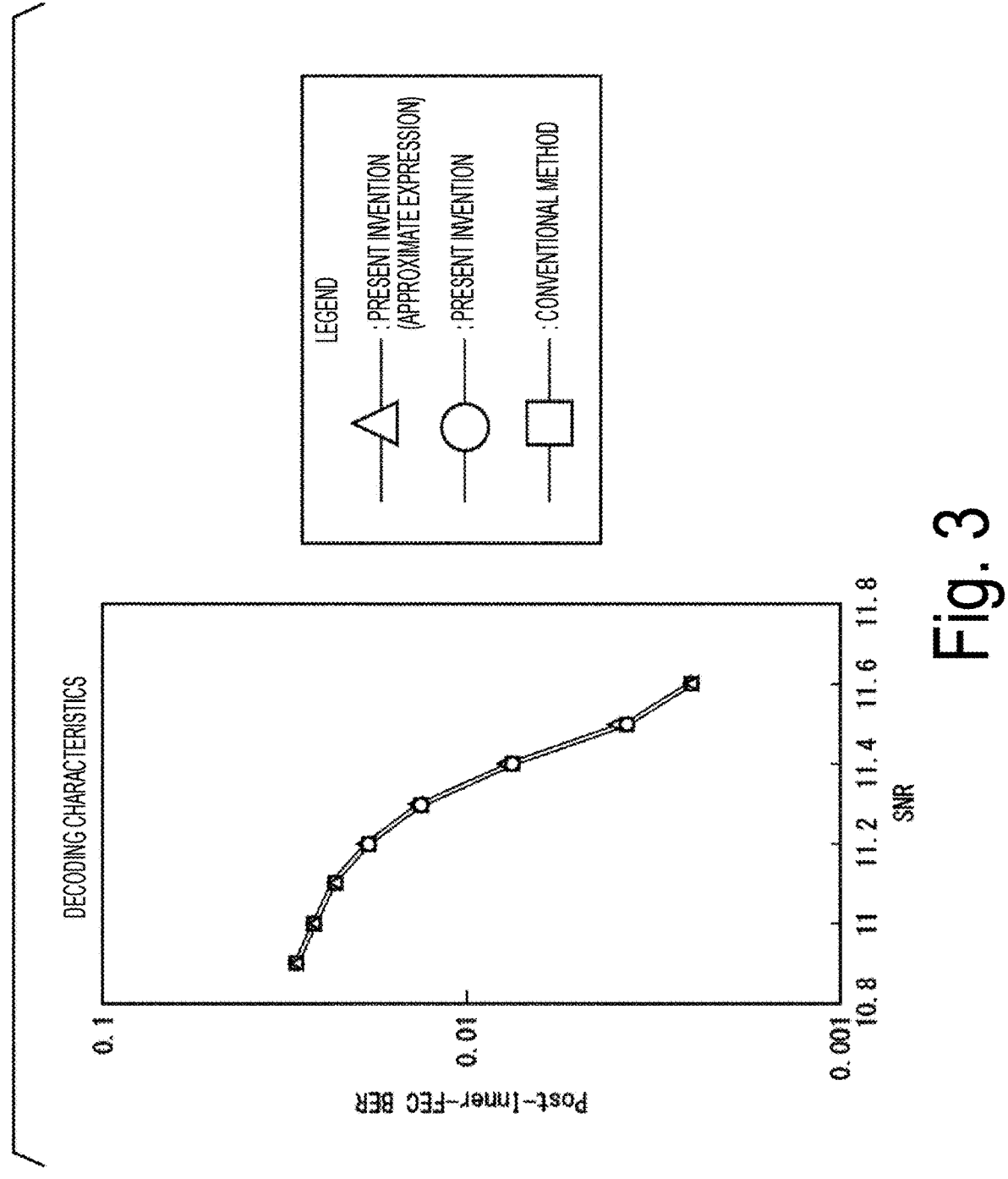
FIG. 3 A diagram illustrating numerical simulation results of the present invention and a conventional method.

FIG. 3 is a diagram illustrating numerical simulation results of the present invention and a conventional method.

In performing the numerical simulation, the numerical simulation was performed with the following parameters.

(Numerical Simulation Parameters)

Monte Carlo simulation (1000 code words)

Under additive white Gaussian noise (AWGN) environment

Coding modulation: probabilistic amplitude shaping

FEC frame length: 21600

Modulation multilevel degree: 16QAM

Information rate: 3.29

Total OH for FEC: 14.82%

FEC code: CP-MLC (d=4)

SD-FEC redundancy 49.9%, [5400, 3602] LDPC code

HD-FEC: None

Referring to the numerical simulation results illustrated in FIG. 3, it has been found that the present invention has performance equivalent to those of the conventional SD block calculation circuit and HD block calculation circuit. More specifically, as a result of the numerical simulation, it has been found that the characteristics hardly change regardless of the conventional circuit, the circuit of the present invention, or the approximate expression thereof. In the conventional method, the number of operations increases exponentially with respect to the division number d, whereas in the present invention, the calculation can be performed in a linear order. Therefore, in comparison to the conventional case, the operation amount can be reduced.

Some functional units (for example, the encoding circuit 10) included in the transmission device 1 and some functional units (for example, the decoding circuit 22) included in the reception device 2 in the above-described embodiment may be implemented by a computer. In that case, a program for implementing the functions may be recorded in a computer-readable recording medium, and the program recorded in the recording medium may be read and executed by a computer system to implement the functions. Note that the "computer system" mentioned herein includes an OS and hardware such as peripheral devices.

In addition, the "computer-readable recording medium" is a portable medium such as a flexible disk, a magneto-optical disc, a ROM, or a CD-ROM, or a storage device such as a hard disk built in a computer system. Further, the "computer-readable recording medium" may include a medium that dynamically holds the program for a short period of time, such as a communication line in a case where the program is transmitted via a network such as the Internet or a communication line such as a telephone line, and a medium that holds the program for a certain period of time, such as a volatile memory inside a computer system serving as a server or a client in that case. In addition, the program described above may be for implementing some of the functions described above, may be implemented in a combination of the functions described above and a program already recorded in a computer system, or may be implemented with a programmable logic device such as a field programmable gate array (FPGA).

Although the embodiment of the present invention has been described in detail with reference to the drawings, the specific configuration is not limited to the embodiment, and includes design and the like within a range not departing from the gist of the present invention.

INDUSTRIAL APPLICABILITY

The present invention can be applied to a communication system using an encoder and a decoder.

REFERENCE SIGNS LIST

1 Transmission device
2 Reception device
10 Encoding circuit
11 Symbol mapper
12 Transmission unit
20 Reception unit
21 Symbol demapper
22 Decoding circuit
110 External encoder
120 1:d converter
130 SD-FEC encoding unit
140 Bit conversion circuit
150 d:m converter
220 Distributor
230 SD likelihood calculation unit
240 SD-FEC decoding unit
250 HD likelihood calculation unit
260 d:1 converter
270 Outer code decoder

The invention claimed is:

1. A decoding circuit used for coherent digital signal processing, the decoding circuit comprising:

a distributor configured to distribute a decoding metric obtained by demodulating transmission data transmitted from a transmission device to each of a plurality of lanes on the basis of information on noise generated in a communication channel and a received signal;

a first likelihood calculation circuit that is provided in one of the plurality of lanes and calculates a first logarithmic likelihood ratio using a decoding metric distributed by the distributor;

a decoder configured to perform error correction decoding using the first logarithmic likelihood ratio and acquires an error-corrected code word;

one or more second likelihood calculation circuits that are provided in a lane different from the lane in which the first likelihood calculation circuit is provided among the plurality of lanes, calculate a second logarithmic likelihood ratio on the basis of the decoding metric distributed by the distributor and the error-corrected code word acquired by the decoder, and perform hard decision;

a combiner configured to combine an output of the decoder and an output of the one or more second likelihood calculation circuits.

2. The decoding circuit according to claim 1, wherein the first logarithmic likelihood ratio is λj(1), and the first likelihood calculation circuit calculates the first logarithmic likelihood ratio based on following Expression (1),

[Math. 1]

$$\lambda_j^{(1)} = l_j^{(1)} \odot l_j^{(2)} \odot \dots \odot l_j^{(d)} \qquad (1)$$

in Expression (1), I on the right side represents logarithmic likelihood, and the operator O• (• is located at the center of O) represents an operator of a function that outputs one real number from two real numbers.

3. The decoding circuit according to claim 1, wherein the second logarithmic likelihood ratio is λj(i) (i is an integer of 1 or more), and the one or more second likelihood calculation circuits calculate the second logarithmic likelihood ratio based on following Expression (2),

[Math. 2]

$$\lambda_j^{(i)} = l_j^{(i)} + (-1)^{z_j^{(1)}} \left( l_j^{(1)} \odot l_j^{(2)} \odot \dots \odot l_j^{(i-1)} \odot l_j^{(i+1)} \odot \dots \odot l_j^{(d)} \right) \qquad (2)$$

in Expression (2), I on the right side represents logarithmic likelihood, and the operator O• (• is located at the center of O) represents an operator of a function that outputs one real number from two real numbers.

4. A decoding method used for coherent digital signal processing, the decoding method comprising:

distributing, by a distributor, a decoding metric obtained by demodulating transmission data transmitted from a transmission device to each of a plurality of lanes on the basis of information on noise generated in a communication channel and a received signal;

calculating, by a first likelihood calculation circuit that is provided in one of the plurality of lanes, a first logarithmic likelihood ratio using the distributed decoding metric;

performing, by a decoder, error correction decoding using the first logarithmic likelihood ratio and acquiring an error-corrected code word;

calculating, by one or more second likelihood calculation circuits that are provided in a lane different from the lane in which the first likelihood calculation circuit is provided among the plurality of lanes, one or more second logarithmic likelihood ratios on the basis of the decoding metric distributed by the distributor and the acquired error-corrected code word, and performing hard decision;

combining, by a combiner, an output of the decoder and an output of the one or more second likelihood calculation circuit.

5. A non-transitory storage medium that stores a program for making a computer perform processes, the processes comprising:

distributing a decoding metric obtained by demodulating transmission data transmitted from a transmission device to each of a plurality of lanes on the basis of information on noise generated in a communication channel and a received signal;

calculating a first logarithmic likelihood ratio using the distributed decoding metric;

performing error correction decoding using the first logarithmic likelihood ratio and acquiring an error-corrected code word;

calculating one or more second logarithmic likelihood ratios on the basis of the distributed decoding metric and the acquired error-corrected code word, and performing hard decision;

combining the acquired error-corrected code word with the calculated one or more second logarithmic likelihood ratios.

* * * * *